March 31, 1959   J. R. CAMPBELL   2,880,304
RESISTANCE WELDING
Filed Jan. 20, 1956

INVENTOR.
JAMES R. CAMPBELL
BY
Campbell, Brumbaugh, Free & Graves
HIS ATTORNEYS

United States Patent Office 2,880,304
Patented Mar. 31, 1959

2,880,304

RESISTANCE WELDING

James R. Campbell, Laguna Beach, Calif., assignor to Fairchild Engine and Airplane Corporation, Hagerstown, Md., a corporation of Maryland Application January 20, 1956, Serial No. 560,371

14 Claims. (Cl. 219—107)

This application is a continuation-in-part of my copending application Serial No. 449,306, filed August 12, 1954, for "Resistance Welding."

This invention relates to resistance welding and has particular reference to welding relatively thin sheet metal to supporting elements.

It has proven difficult to weld various metal elements to sheet metal in various instances. For example, in the manufacture of stainless steel honeycomb sandwich, it is necessary to weld a stainless steel skin or skins to a stainless steel honeycomb core that may be formed, for example, from foil ⅓ to ⅛ the thickness of the skin. Due to the greater thickness and area of the skin and its contact with the welding electrodes, it fails to heat to the temperature of the honeycomb core resulting in an unsatisfactory bond between the pieces. If a large enough current is provided to heat the skins to the desired temperature, the core foil has a tendency to disintegrate or blow away.

It has been suggested that coincident with the heating of the skin and core, a forging operation be undertaken to press the skins into the core at a rate equal to the rate at which the core edges are being melted by the passage of current. This aids in preventing blowing away of the core. However, the decrease in total panel thickness is great in such a process and results in an unsatisfactory and poorly surfaced honeycomb sandwich.

Other attempts have been made to provide additional heating means for the skins to bring them to a point approaching the temperature of the core, since it has been found that welding is ideal when both these pieces attain approximately the same temperature. Such additional means have included secondary current flow through the skin as well as the passage of welding current through the skin from a multiplicity of electrode points. However, none of these methods have proven entirely satisfactory in welding the skin to the core.

The present invention overcomes the above deficiencies of resistance welding of sheet metal such as stainless steel to supporting elements, such as disclosed in the above example, by disposing a thin layer of a highly conductive material on the supporting elements. Thus, returning to the case of stainless steel honeycomb sandwich, the end of the honeycomb core is preferably cleaned so that the steel skin contacts the stainless steel core. With this arrangement, it has been found that the passage of current through the sandwich welds the edges of the honeycomb core to the skin efficiently to provide a honeycomb sandwich of exceptional strength. While a specific example has been chosen to broadly state the invention, it is evident that various other welding operations may be performed by employing the principles of the present invention.

These and further advantages of the invention will be more readily understood when the following description is read in connection with the accompanying drawings in which.

Figure 1:
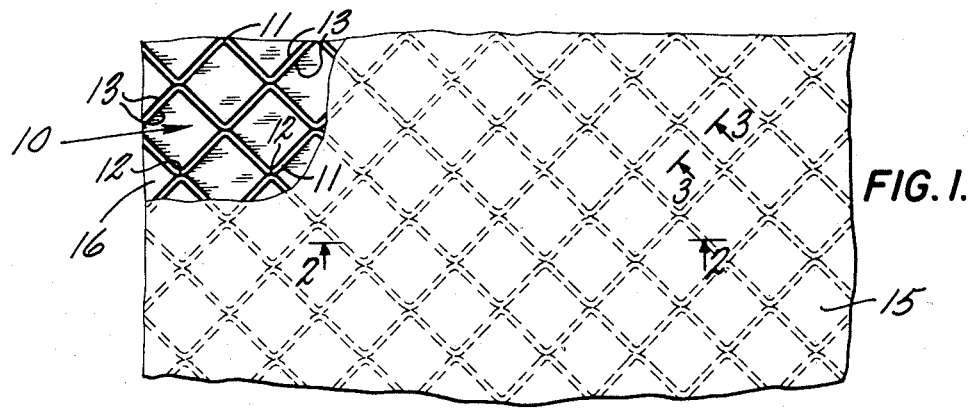
Figure 1 is a plan view, partially broken away, of a honeycomb sandwich welded in accordance with the principles of the present invention.

The invention will be described with particular reference to the manufacture of stainless steel honeycomb sandwich but it will be understood that the principles set forth are equally applicable to resistance welding of various other structures where supporting elements must be welded to a metal sheet. Referring to the drawings, a stainless steel core 10 is formed by welding appropriately formed elongated strips of stainless steel foil 11 at their points of contact 12, the cell structure being square as shown although obviously, any other shaped cell may be employed. Each of the strips 11 has a thin layer 13 of a highly conductive material disposed thereon as may be clearly seen in Figures 3 and 4. This layer may be applied to the core material in any desired manner such as by plating, rolling, or other known methods. Further, the layer 13 may comprise a highly conductive material such as copper, silver, gold, aluminum or other highly conductive materials.

Figures 3, 4:
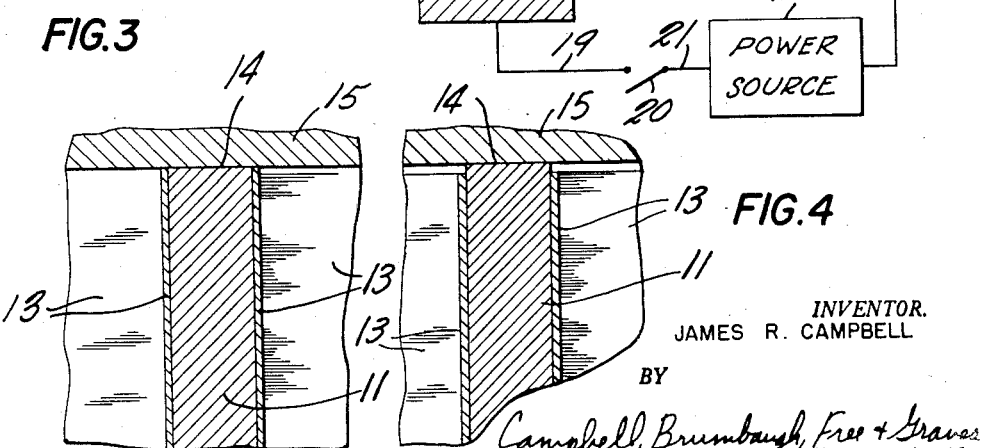
Figure 3 is a partial section, greatly enlarged, of the abutment of one of the skins and the core shown in Figure 1 taken on the view line 3—3 looking in the direction of the arrows.
Figure 4 is a partial section similar to Figure 3 illustrating the abutment of one of the skins and a modified core.

The edges or ends 14 of the core 10 are shown in Figure 3 to be clean. However, the highly conductive material 13 may also be disposed on these edges if, for example, it is plated on the core 10 and the further step of cleaning the edges 14 is omitted. Of course, the edges 14 may be cleaned by sanding or other methods if desired. It may, in some instances, be desirable to clean the ends of the core 11 as shown in Figure 4 so that the highly conductive material 13 is spaced from the surface against which the core 11 abuts.

Abutting the core 10 on either side thereof are two stainless steel skins 15 and 16 which, together with the core 10, form what is termed a stainless steel honeycomb sandwich. Usually, the skins 15 and 16 are substantially thicker than the core foil 11.

It should be noted that the thickness of the foil 11 has been somewhat exaggerated for the sake of clarity. In practice, the core foil may be .002 inch thick, for example, while the stainless steel skins may range from 3 to 8 times this thickness. These dimensions are given by way of example and are not, of course, to be construed as limiting the invention.

Before proceeding further, it should be understood that the highly conductive layer 13 disposed on the foil strips 11 are extremely thin and on the order of a few ten thousands of an inch in thickness, the thickness of this layer being exaggerated in Figures 3 and 4 for clarity. The invention is not, of course, limited to the above dimensions but they should be kept in mind in order to comprehend the specific embodiment of the invention herein described.

Examining Figure 3, a greatly enlarged section of one of the foil strips 11 and the skin 15 is illustrated. The thin layers 13 of highly conductive material on the foil strips 11 engage the skin 15 while the edge 14 of the core 10 directly contacts the skin 15. Of course, the area 14 may be plated with the highly conductive material as explained above.

Figure 2:
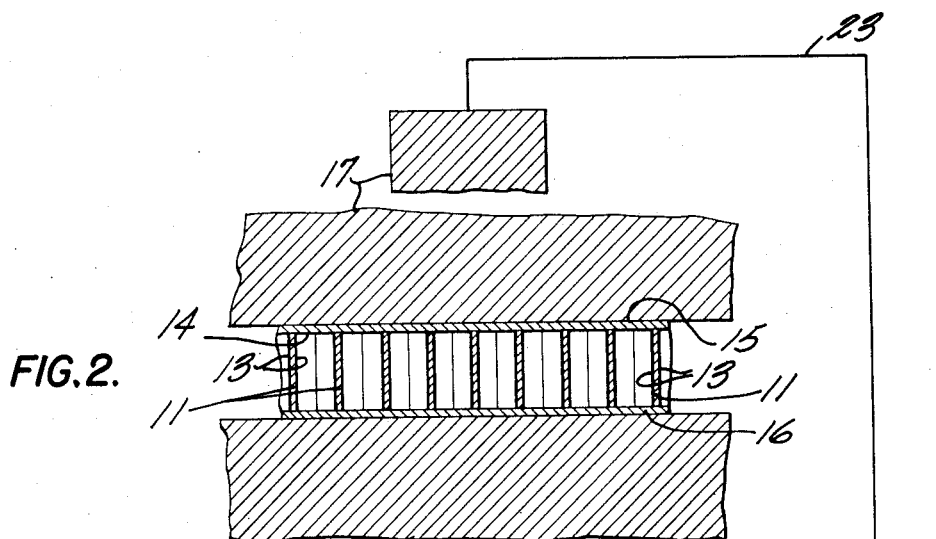
Figure 2 is a transverse section of the sandwich illustrated in Figure 1 taken on the view line 2—2 looking in the direction of the arrows, welding electrodes and a power source also being illustrated.

Continuing with the description of the apparatus employed in practicing the present invention, conventional welding electrodes 17 and 18, illustrated in Figure 2 and omitted from Figure 1 for clarity, are positioned to engage the upper and lower skins 15 and 16, respectively, these electrodes being of any desired configuration and size and extending over the entire area of the portion of the honeycomb sandwich illustrated in Figure 2. A conductor 19, a switch 20, and a conductor 21 join the electrode 18 to a power source 22 while a conductor 23 joins the electrode 17 to the power source 22. It will be understood that this description of the welding circuit is greatly simplified since ordinarily, complex timing equipment, etc., is employed for timing the welding current interval.

With the core 10, the skins 15 and 16 and the electrodes 17 and 18 arranged as shown in Figure 2, the switch 20 may be momentarily closed to cause the passage of a heavy welding current between the electrodes 17 and 18. Obviously, this heavy current will flow through the skins 15 and 16 and the core 10.

In the absence of the layers of highly conductive material 13, the greater density of current in the foil strips 11 due to their small surface area will cause the $I^2R$ heat generated therein to exceed that produced in the skins 15 and 16. This fact coupled with the heat drag-out from the skins 15 and 16 by the electrodes 17 and 18 formerly caused the temperature of the core 10 to greatly exceed that of the skins 15 and 16. If the current density was sufficiently raised to heat the skins 15 and 16 to the necessary temperature, the core 10 would often overheat and blow away.

However, due to the layers 13 of high conductivity material such as copper on the core 10, a substantial increase in current may be passed through a honeycomb sandwich constructed in accordance with the present invention. This is possible because the low resistance of the layers 13 reduce the $I^2R$ heating effects in the core 10. In other words, the high conductivity layers 13 carry the current over and around the strips 11 and prevent overheating of the core 10. The new value of current passed through the honeycomb sandwich between the electrodes 17 and 18 may be made sufficiently great to heat the skins 15 and 16 to a temperature approaching that of the core 10. This is a preferable condition in properly fusing the skins 15 and 16 to the core 10 with the greatest strength therebetween.

With the arrangement illustrated in Figure 3, the contact resistance between the core 11 and skins 15 and 16 produces sufficient $I^2R$ heating for welding. When the end 14 of the core 11 is cleaned as shown in Figure 4, the relatively high resistance of the core between the skins 15 and 16 and the high conductivity layers 13 is added to the contact resistance and the resulting $I^2R$ heating provides for efficient welding. It will be evident that if the cleaned end portion of the core 11 extends only a short distance from the skin, it will when melted permit the direct engagement of the skins 15 and 16 and the high conductivity layers 13, this action increasing the total current flow and heating in the skins 15 and 16 to assist in melting their inner surfaces.

It will be apparent that in practice, cleaning of the ends 14 of the core 11 may provide abutments between the core 11 and skins 15 and 16 as shown in both Figures 3 and 4. However, it should be understood that with either type of abutment, the high conductivity layers 13 preclude excessive heating and blowing away of the core 11 while facilitating the heating of the skins 15 and 16 due to the increased current carrying capacity of the structure.

It has been found, for example, that in the manufacture of stainless steel honeycomb sandwich, a 40% stronger weld results from the use of a stainless steel core coated with copper than with an unplated core. Reduced to specific figures, by utilizing the welding methods of the the present invention with stainless steel skin and a copper plated stainless steel core, a honeycomb sandwich is produced which will withstand 70,000 to 80,000 p.s.i., an outstanding weld strength in this field.

It will be understood that the principles of the invention have been explained in connection with stainless steel honeycomb sandwich structure. However, it is evident that these principles are equally applicable to other welding operations. For example, steel ribs, flanges, longerons and similar supports may be resistance welded to metal surface skins by employing the principles of the present invention. Of course, the metal may be other than steel, the critical point being that the member to be attached thereto is coated with a relatively high conductivity material.

It will be understood that the above-described embodiments of the invention are illustrative only and modifications thereof will occur to those skilled in the art. For example, the sheet metal may be porous, sintered metal skins. In addition, the members to be welded to the sheet metal may be formed from other than the specific metal forming the sheet. Therefore, the invention is not to be limited to the specific apparatus disclosed herein but is to be defined by the appended claims.

I claim:

1. A method of resistance welding comprising the steps of abutting against a sheet of metal an edge of a composite metal piece formed by at least one thin layer of a relatively high conductivity metal on a metal element thick in comparison to the metal layer, and passing a high density welding current in series through the composite piece and the sheet to weld them together at their abutment, all of the welding current passing through the composite piece in series from one of its edges to the opposite edge, a portion of the current being bypassed through the high conductivity metal layer to prevent overheating of the metal element while it is being welded to the metal sheet.

2. A method of resistance welding comprising the steps of disposing a thin layer of a relatively high conductivity metal on a metal element thick in comparison to the metal layer to form a composite metal piece, abutting an edge of the metal piece against a sheet of metal, and passing a high density welding current in series through the composite piece and sheet to weld them together at their abutment, all of the welding current passing through the composite piece in series from one of its edges to the opposite edge, a portion of the current being bypassed through the high conductivity metal layer to prevent overheating of the metal element while it is being welded to the metal sheet.

3. A method of resistance welding comprising the steps of disposing a thin layer of a relatively high conductivity metal on a lower conductivity metal element thick in comparison to the metal layer to form a composite metal piece, removing the layer of metal from an end portion of the lower conductivity metal element, abutting said end portion of the element against a sheet of metal, and passing a high density welding current in series through the composite metal piece and the sheet to weld them together at their abutment, all of the welding current passing through the composite piece in series from one of its ends to the opposite end, a portion of the current being bypassed through the high conductivity metal layer to prevent overheating of the metal element while it is being welded to the metal sheet.

4. A method of resistance welding comprising the steps of disposing a thin layer of a relatively high conductivity metal on a lower conductivity honeycomb core, abutting an edge of the honeycomb core against a sheet of metal, and passing a high density welding current in series through the core and the sheet to weld them together at their abutment, all of the welding current passing through the core in series from one of its edges to the opposite edge, a portion of the current being bypassed through the high conductivity metal layer to prevent overheating of the core while it is being welded to the metal sheet.

5. A method according to claim 4, wherein the lower conductivity metal and the metal sheet are formed of stainless steel.

6. A method of resistance welding comprising the steps of disposing a thin layer of a relatively high conductivity metal on a lower conductivity honeycomb core removing the high conductivity metal from an end portion of the core, abutting said end of the core against a sheet of metal, and passing a high density welding current in series through the core and the sheet to weld them together at their abutment, all of the welding current passing through the core in series from one of its ends to the opposite end, a portion of the current being bypassed through the high conductivity metal layer to prevent overheating of the core while it is being welded to the metal sheet.

7. A method of resistance welding comprising the steps of disposing a thin layer of a relatively high conductivity metal on a lower conductivity honeycomb core, abutting the edges of the core against a pair of sheets of metal, and passing a high density welding current in series through the sheets and core to weld them together at their abutments, all of the welding current passing through the core in series from one of its edges to the opposite edge, a portion of the current being bypassed through the high conductivity metal layer to prevent overheating of the core while it is being welded to the metal sheet.

8. A method according to claim 7 wherein the lower conductivity core and the metal sheets are formed of stainless steel.

9. A method of resistance welding comprising the steps of providing a honeycomb core formed of a relatively low conductivity metal having a thin layer of a higher conductivity metal thereon, abutting the opposite edges of the core against a pair of metal sheets, and passing a high density welding current in series through the sheets and cores to weld them together at their abutments, all of the welding current passing through the core in series from one of its edges to the opposite edge, a portion of the current being bypassed through the high conductivity metal layer to prevent overheating of the core while it is being welded to the metal sheets.

10. A method of resistance welding comprising the steps of plating a thin layer of copper on a honeycomb core formed of stainless steel foil, abutting both edges of the core against a pair of stainless steel sheets, and passing a high density welding current in series through the sheets and the core to weld them together at their abutments, all of the welding current passing through the core in series from one of its edges to the opposite edge, a portion of the current being bypassed through the copper layer to prevent overheating of the core while it is being welded to the metal sheets.

11. A method of resistance welding comprising the steps of plating a thin layer of copper on a honeycomb core formed of stainless steel foil, removing the copper from both end portions of the core, abutting said ends against a pair of stainless steel sheets, and passing a high density welding current in series through the sheets and core to weld them together at their abutments, all of the welding current passing through the core in series from one of its ends to the opposite end, a portion of the current being bypassed through the copper layer to prevent overheating of the core while it is being welded to the metal sheets.

12. A method of resistance welding comprising the steps of masking an end portion of an element formed of a relatively low conductivity metal element, disposing a thin layer of a higher conductivity metal on the element to form a composite piece, removing the masking from the end of the element, abutting said end against a metal sheet, and passing a high density welding current in series through the composite piece and the sheet to weld them together at their abutment, all of the welding current passing through the composite piece in series from one of its ends to the opposite end, a portion of the current being bypassed through the high conductivity metal layer to prevent overheating of the metal element while it is being welded to the metal sheet.

13. An article of manufacture for resistance welding comprising a honeycomb core formed from a relatively low conductivity metal foil and having disposed thereon a layer thin in comparison to the honeycomb core thickness of a higher conductivity metal extending between the core ends.

14. An article of manufacture for resistance welding comprising a honeycomb core of stainless steel foil plated with a layer of copper thin in comparison to the honeycomb core thickness on the walls thereof extending between the core ends.

References Cited in the file of this patent
UNITED STATES PATENTS

| | | |
|---|---|---|
| 1,659,920 | Murray | Feb. 21, 1928 |
| 2,056,563 | Budd et al. | Oct. 6, 1936 |
| 2,108,795 | Budd | Feb. 22, 1938 |
| 2,299,776 | Weightman | Oct. 27, 1942 |